(12) United States Patent
Varanasi et al.

(10) Patent No.: US 7,939,129 B2
(45) Date of Patent: May 10, 2011

(54) DEPOSITION OF IRON OXIDE COATINGS ON A GLASS SUBSTRATE

(75) Inventors: Srikanth Varanasi, Toledo, OH (US); Michael P. Remington, Jr., Toledo, OH (US)

(73) Assignee: Pilington North America, Inc., Toledo, OH (US)

( * ) Notice: Subject to any disclaimer, the term of this patent is extended or adjusted under 35 U.S.C. 154(b) by 504 days.

(21) Appl. No.: 10/765,256

(22) Filed: Jan. 26, 2004

(65) Prior Publication Data

US 2005/0164011 A1 Jul. 28, 2005

(51) Int. Cl.
*C23C 16/40* (2006.01)
*B05D 5/06* (2006.01)

(52) U.S. Cl. .................. 427/165; 427/166; 427/255.31

(58) Field of Classification Search .............. 427/255.28, 427/255.29, 255.31, 165, 166
See application file for complete search history.

(56) References Cited

U.S. PATENT DOCUMENTS

| | | | | |
|---|---|---|---|---|
| 3,695,908 | A | | 10/1972 | SzupIllo |
| 3,852,098 | A | | 12/1974 | Bloss et al. |
| 3,892,888 | A | * | 7/1975 | Halaby et al. ............... 427/127 |
| 3,920,454 | A | * | 11/1975 | Thompson .................... 430/5 |
| 3,996,395 | A | * | 12/1976 | Chen et al. ................... 427/129 |
| 4,027,056 | A | * | 5/1977 | Thompson ................... 427/226 |
| 4,717,584 | A | * | 1/1988 | Aoki et al. ................... 427/573 |
| 4,975,324 | A | * | 12/1990 | Torii et al. ................... 428/329 |
| 5,006,395 | A | * | 4/1991 | Hori et al. .................... 428/141 |
| 5,080,847 | A | * | 1/1992 | Hazeyama .................... 264/112 |
| 5,183,510 | A | * | 2/1993 | Kimura ........................ 118/719 |
| 5,235,936 | A | * | 8/1993 | Kracklauer .................. 123/1 A |
| 5,464,683 | A | * | 11/1995 | Rudigier et al. ............. 428/216 |
| 5,686,178 | A | * | 11/1997 | Stevens et al. ............... 428/336 |
| 5,725,672 | A | * | 3/1998 | Schmitt et al. ............... 118/715 |
| 5,780,372 | A | * | 7/1998 | Higby ........................... 501/70 |
| 6,037,091 | A | * | 3/2000 | MacLeod et al. .......... 430/111.32 |
| 6,187,462 | B1 | * | 2/2001 | Doi et al. .................... 428/836.2 |
| 6,238,738 | B1 | * | 5/2001 | McCurdy .................... 427/255.19 |
| 6,274,207 | B1 | * | 8/2001 | Balkus et al. ................ 427/596 |
| 6,524,647 | B1 | * | 2/2003 | Varanasi et al. ............. 427/166 |
| 6,827,970 | B2 | * | 12/2004 | Varanasi et al. ............. 427/166 |
| 2002/0135099 | A1 | * | 9/2002 | Robinson et al. ............ 264/236 |
| 2003/0008176 | A1 | * | 1/2003 | Koujima et al. ............ 428/694 T |

FOREIGN PATENT DOCUMENTS

GB  1 349 464 A  4/1974

OTHER PUBLICATIONS

Pflitsch, Christian, et al., "Growth of Thin Iron Oxide Films on Si(100) by MOCVD". J. Electrochem. Soc., vol. 153, Issue 8, pp. C546-C550 (2006).*
Eiji Fuji, et al.; *Low-Temperature Preparation and Properties of Spinel-Type Iron Oxide Films by ECR Plasma-Enhanced Metalorganic Chemical Vapor Deposition*; Japanese Journal of Applied Physics, Publication Office of Japanese Journal of Applied Physics, Tokyo, JP, vol. 32, No. 10B, Oct. 15, 1993, pp. L1527-L1529.
Sharon. M., et al., *Preparation and Characterization of Iron Oxide Thin Film Electrodes*, Database Inspec 'Online! The Institution of Electrical Engineers, Stevenage, GB, Mar. 1983 & Solar Energy Materials Netherlands, vol. 8, No. 4, Apr. 1983; pp. 457-469.
*Patent Abstracts of Japan*, vol. 14, No. 582, Dec. 26, 1990 & JP 02 254155, Daido Steel Co., Ltd., Oct. 12, 1990.

* cited by examiner

*Primary Examiner* — Bret B Chen
(74) *Attorney, Agent, or Firm* — Marshall & Melhorn, LLC

(57) ABSTRACT

A method is defined for producing an iron oxide coating on a glass article. The article is preferably for use as an architectural glazing. The method includes providing a heated glass substrate having a surface on which the coating is to be deposited. Ferrocene and an oxidant are directed toward and along the surface to be coated, and the ferrocene and the oxidant are reacted at or near the surface of the glass substrate to form an iron oxide coating.

22 Claims, No Drawings

DEPOSITION OF IRON OXIDE COATINGS ON A GLASS SUBSTRATE

BACKGROUND OF THE INVENTION

1. Field of the Invention

The present invention relates to a continuous, chemical vapor deposition (CVD) method for producing a coated glass article, particularly coated architectural glass, and to the coated article so produced. Specifically, the invention relates to an improved method for producing a glass article coated with a layer of iron oxide ($Fe_xO_y$), and the coated glass article formed thereby.

2. Summary of Related Art

Known processes for producing coated glass articles can yield coated glass articles with varying properties. One of the properties controllable through selection of coatings is the apparent color of the coated article. One aesthetically pleasing color for glass articles, particularly for glass used as architectural glass, is glass with a gold appearance. Therefore, an object of the present invention is to provide a coated glass article with an aesthetically pleasing gold appearance.

SUMMARY OF THE INVENTION

A method is defined for producing an iron oxide coating on a glass article. The article is preferably for use as an architectural glazing. The method includes providing a heated glass substrate having a surface on which the coating is to be deposited. Ferrocene and an oxidant are directed toward and along the surface to be coated, and the ferrocene and the oxidant are reacted at or near the surface of the glass substrate to form an iron oxide coating.

DETAILED DESCRIPTION OF THE PREFERRED EMBODIMENT

In accordance with the present invention, there is provided a method for the deposition of an iron oxide layer on a substrate, particularly a glass substrate. An iron oxide layer, as defined herein, is a coating containing primarily iron oxide, with the iron typically present in varying valences, and possibly containing trace contaminants, for example carbon. Specifically, the invention relates to the atmospheric pressure chemical vapor deposition of an iron oxide layer from a combination of: ferrocene and an oxidant. Preferably, an inert carrier gas is combined with the ferrocene and the oxidant. Additionally, within the scope of the present invention, it is also possible that a solvent can be used in conjunction with the other precursors. The preferred oxidant for use in the present invention is elemental oxygen gas.

It has been found, in conjunction with the method of the present invention, that the use of ferrocene allows the deposition of an iron oxide layer with significant control over the valence of the iron deposited. Control of the valence of the product layer is significant in terms of properties of the layer, including, but not limited to the color of the layer. Additionally, the use of ferrocene in conjunction with the present invention results in increased deposition rates allowing for the deposition of thicker iron oxide coatings, again resulting in control of the properties of the resultant coated glass article.

The iron oxide coating can be used alone or in combination with additional coatings applied to the substrate. Preferably, the invention can be used in conjunction with additional layers to produce solar control, low emissivity products, with an aesthetically pleasing gold color for architectural glazing applications. Most preferably, the deposited iron oxide layer is primarily, in the form $Fe_2O_3$.

The method of the present invention is preferably carried out in an on-line, float glass production process, which is well known in the art. An example of such a process can be found in U.S. Pat. No. 5,798,142, which is hereby incorporated by reference as if set forth in its entirety herein.

In a preferred embodiment of the present invention, a heated glass substrate is provided, the substrate having a surface on which the coating is to be deposited. Ferrocene, an oxidant and preferably an inert carrier gas are directed toward and along the surface to be coated. The mixture is reacted at or near the surface of the glass substrate to form the iron oxide coating. Subsequently, the coated glass substrate is cooled to ambient temperature. Preferably, the inert carrier gas is either helium or nitrogen or a combination thereof. Oxygen gas is the preferred oxidant for use in the present invention, but it is possible, and within the scope of the present invention, that other oxidants may be used. Typically, according to the present invention, growth (deposition) rates of $\geq$ about 200 Å/sec can be achieved.

The precursor mixture used in the present invention can preferably contain gas phase concentrations of ferrocene in the range of about 0.1 to about 5.0%. Preferably, the ferrocene concentration is in the range of from about 0.3 to about 3.0% and most preferably from about 0.6 to about 2.5%.

Oxygen is preferably present, as expressed in gas phase concentrations, in the amount of about 1 to about 50%. Preferably, the oxygen is present in the range of from about 3 to about 40% and most preferably from about 5 to about 35%.

As stated previously, an optional solvent may be used to dissolve the ferrocene, depending on the precise method of deposition. If a solvent is used, the concentrations of solvent will depend on the concentration of the individual ferrocene solutions and the flow rate needed to generate the ferrocene concentrations desired.

The preferred method of delivery, as described above, is through a chemical vapor deposition process, in an on-line float glass production process. Some possible methods of preparing precursors for use in the CVD process can include the use of a bubbler as well as solution delivery in conjunction with a thin film evaporator. U.S. Pat. No. 6,521,295 (column 3, line 60 etc.) discloses such a process and is hereby incorporated by reference as if set forth in its entirety herein. U.S. Pat. No. 6,521,295 discloses that an organoantimony-containing reactant stream is combined with the organotin reactant stream at a point prior to delivery of the reactants to the surface of the hot glass substrate upon which the coating is to be deposited. After combination, the vaporized reactants of organotin, organoantimony, water and an oxygen-containing compound are delivered to the surface of the hot glass, where they react together to deposit thereon a coating of antimony doped tin oxide. U.S. Pat. No. 6,521,295 further teaches that the resulting gaseous reactant stream of organoantimony and water vapor is combined with the gaseous organotin reactant stream to form a uniform, gaseous reactant stream. The uniform, gaseous reactant stream is delivered to the surface of the hot glass substrate.

The product made from the inventive process described herein will preferably be gold colored in both transmission and reflection (T and Rg). Such a product was previously unknown, as known gold tinted products based on silicon and even actual sputtered gold (i.e. sputtered elemental gold) products are green in transmission (i.e., $a^* < 0$).

As used herein, the term gold colored indicates: an $a^*$ value $\geq$ about −5 and $\leq$ about 10 and a $b^*$ value $\geq$ about 10 and $\leq$ about 40. Aesthetically pleasing gold colors, which may be most preferable in embodiments of the present invention, can have an a* value ≧ about −1 and ≦ about 8; and a b* value ≧ about 18 and ≦ about 40, wherein a* and b* are defined on the CIElab color scale.

The iron oxide coating deposited according to the present invention preferably has a thickness between about 300 to about 700 angstroms; more preferably between about 400 to about 650 angstroms; and most preferably between about 500 to about 625 angstroms.

The deposition rates indicated above (greater than about 200 Å/sec) can yield thicknesses of iron oxide layers greater than those known in the art. This can be advantageous in that the iron oxide layers are highly absorbing (especially in the blue range) and the thicker layers will thus absorb more light. These thicker layers than previously attained can thus yield more aesthetically pleasing colors, and can also result in the article having a gold color in both reflectance and transmittance.

An additional advantage of glass produced according to the present invention is that the coated article can be relatively more resistant to stress than known iron oxide articles. Specifically, the glass article described herein can retain the aesthetically pleasing color when tempered or after being bent or shaped.

As stated above, it is also possible in conjunction with the present invention to provide additional coatings with the iron oxide coating discussed herein. Coatings may be applied between the iron oxide coating and the substrate, and/or above the iron oxide coating. It is to be especially appreciated that it is possible to produce an iron oxide coating according to the present invention that is applied in conjunction with other layers appropriate to form a "low E" coating. An example of such a low E coating that could be used in conjunction with the present invention can be found in U.S. Pat. No. 5,698,262, which is hereby incorporated by reference as if set forth in its entirety herein.

EXAMPLES

The following examples, which constitute the best mode presently contemplated by the inventors for practicing the present invention, are presented solely for the purpose of further illustrating and disclosing the present invention, and are not to be construed as a limitation on the invention.

All examples given depict actual experimental results. Depositions were carried out on a laboratory conveyor furnace at 1170 degrees F. at a line speed of 200 ipm (inches per minute). Total flow was between 35 and 45 slm (standard liters per minute) for all examples. Substrates were 12"×48" soda-lime float glass coated with a nominal 200 angstrom thick film of $SiO_2$.

Table 1 provides examples in which the ferrocene was delivered via a bubbler system. The ferrocene bubbler was held at 374 degrees F. In each table, thickness is reported in angstroms. O denotes a thickness determined optically while P represents a thickness established by chemical etching and profiling. Where thickness values are unlisted, the results were not obtained. Reflection was measured using a Minolta Spectrophotometer CM-2002 and the values are an average of several measurements across the 10" width of coating.

TABLE 1

| Example # | % Ferrocene | % O2 | % Visible Reflection | Thickness (O or P) |
|---|---|---|---|---|
| 1 | 0.26 | 2.67 | 45 | |
| 2 | 0.26 | 1.33 | 38 | |
| 3 | 0.26 | 10.81 | 51 | |
| 4 | 0.30 | 14.36 | 50 | 554 (O), 600 (P) |
| 5 | 0.56 | 13.83 | 27 | |
| 6 | 0.34 | 14.02 | 47 | |
| 7 | 0.26 | 21.62 | 51 | |
| 8 | 0.26 | 43.25 | 42 | |

Table 2 demonstrates the method of delivering the ferrocene as a solution using ethyl acetate (EtOAc) as the solvent. The thin film evaporator was kept at 500 degrees F.

TABLE 2

| Example # | % Ferrocene | % O2 | % EtOAc | % Visible Reflection | Thickness (O or P) |
|---|---|---|---|---|---|
| 9 | 0.38 | 16.00 | 8.98 | 29 | |
| 10 | 0.66 | 14.78 | 15.56 | 24 | 198 (O), 190 (P) |

Similarly, Table 3 illustrates the efficacy of delivering ferrocene dissolved in the solvent THF (tetrahydrofuran). The thin film evaporator was kept at 500 degrees F.

TABLE 3

| Example # | % Ferrocene | % O2 | % THF | % Visible Reflection | Thickness (O or P) |
|---|---|---|---|---|---|
| 11 | 0.45 | 6.22 | 6.22 | 44 | |
| 12 | 0.40 | 16.60 | 5.54 | 46 | |
| 13 | 0.58 | 16.12 | 8.06 | 43 | |
| 14 | 0.75 | 15.67 | 10.45 | 47 | 602 (O), 716 (P) |

Table 4 displays the repeatability of the process. An additional seventeen samples were produced at a total flow of 41.5 slm comprising 0.2% ferrocene and 14.4% oxygen.

TABLE 4

| Property | Value | Standard Deviation |
|---|---|---|
| Film side reflection (Rf) | 45.5 | 1.5 |
| Glass side reflection (Rg) | 40.1 | 1.5 |
| Glass side a* (Rg a*) | 3.7 | 1.5 |
| Glass side b* (Rg b*) | 21.5 | 0.9 |

As stated previously, the coating of the present invention can be used in conjunction with additional layers to provide added functionality to the final product. This has been demonstrated by depositing iron oxide according to the present invention on Pilkington Energy Advantage™. The resulting monolithic properties are summarized in Table 5.

TABLE 5

| Transmission | | Film Side | | | | | Glass Side | | | |
|---|---|---|---|---|---|---|---|---|---|---|
| Vis | Solar | a* | b* | R | a* | b* | R | a* | b* | Eh |
| 47.6 | 52.4 | 6.90 | 30.34 | 30.4 | −0.23 | 1.80 | 20.6 | 4.39 | 18.15 | 0.178 |

For calculation of the solar and thermal properties of 6 mm samples, the properties of the iron oxide film grown on 3 mm glass substrates was extrapolated to 6 mm substrates. This 6 mm monolithic sample provides a solar heat gain coefficient (SHGC) of 0.54 and a $U_{winter}$ value of 0.65. When placed in an IG unit using a 6 mm clear inboard light, with the coating on the number two surface and air as the insulating gas, one can obtain a SHGC of 0.47 and a $U_{winter}$ value of 0.34.

As used hereinabove, the U-factor measures how well a product prevents heat from escaping. The rate of heat loss is indicated in terms of the U-factor of a window assembly. U-factor ratings generally fall between 0.20 and 1.20. The lower the U-factor, the greater a window's resistance to heat flow and the better its insulating value. The U-factor is included in the energy performance rating (label) offered by the National Fenestration Rating Council (NFRC).

As used hereinabove, the Solar Heat Gain Coefficient (SHGC) measures how well a product blocks heat caused by sunlight. The SHGC is the fraction of incident solar radiation admitted through a window, both directly transmitted and absorbed, then subsequently released inward. SHGC is expressed as a number between 0 and 1. The lower a window's SHGC, the less solar heat it transmits.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for depositing an iron oxide coating on a glass article by atmospheric pressure chemical vapor deposition in an on-line float glass process, comprising:
   providing a heated glass substrate having a surface on which the coating is to be deposited;
   premixing ferrocene and an oxidant to form a uniform gaseous precursor mixture;
   directing the precursor mixture toward and along the surface to be coated; and
   reacting the precursor mixture at or near the surface of the glass substrate to form an iron oxide coating,
   wherein the iron oxide coating formed thereby is primarily in the form of $Fe_2O_3$.

2. The method according to claim 1 further comprising providing an inert carrier gas with the ferrocene and oxidant.

3. The method according to claim 2, wherein the inert carrier gas comprises at least one of helium and nitrogen.

4. The method according to claim 2, wherein the gas phase ferrocene concentration is in the range of about 0.1 to about 5.0%.

5. The method according to claim 2, wherein the gas phase ferrocene concentration is in the range of about 0.3 to about 3.0%.

6. The method according to claim 2, wherein the gas phase ferrocene concentration is in the range of about 0.6 to about 2.5%.

7. The method according to claim 2, wherein the gas phase oxidant concentration is about 1 to about 50%.

8. The method according to claim 2, wherein the gas phase oxidant concentration is about 3 to about 40%.

9. The method according to claim 2, wherein the gas phase oxidant concentration is about 5 to about 35%.

10. The method according to claim 2, further comprising dissolving the ferrocene in a solvent.

11. The method according to claim 1 wherein the oxidant is oxygen gas.

12. The method according to claim 1 further comprising cooling the coated glass article to ambient temperature.

13. The method according to claim 1 wherein the iron oxide coating deposited by the process is deposited at a rate of greater than or equal to about 200 Å/sec.

14. The method according to claim 1, wherein the deposited iron oxide coating as a thickness between about 300 and about 700 Å.

15. The method according to claim 1, wherein the coated article formed thereby is an architectural glazing.

16. The method according to claim 1, further comprising depositing an additional coating between the iron oxide coating and the substrate.

17. A method of utilizing ferrocene in an atmospheric pressure chemical vapor deposition process which occurs in an on-line float glass process to form an iron oxide layer primarily comprising $Fe_2O_3$ on a substrate, wherein the ferrocene and an oxidant are premixed and subsequently delivered to the substrate for use in the chemical vapor deposition process, and wherein an additional coating is applied between the iron oxide layer and the substrate.

18. The method according to claim 17 comprising depositing an iron oxide layer on the substrate at a rate of greater than or equal to about 200 Å/sec.

19. The method according to claim 17, wherein the iron oxide layer has a thickness between about 300 and about 700 Å.

20. The method according to claim 17, wherein the deposited iron oxide layer has a thickness between about 400 and about 650 Å.

21. The method according to claim 17, wherein the deposited iron oxide layer has a thickness between about 500 and about 625 Å.

22. The method according to claim 17, wherein the article formed thereby is an architectural glazing.

* * * * *